United States Patent [19]

Giammanco

[11] 3,973,665
[45] Aug. 10, 1976

[54] ARTICLE DELIVERY AND TRANSPORT APPARATUS FOR EVACUATED PROCESSING EQUIPMENT

[75] Inventor: Rosario P. Giammanco, Gloucester, Mass.

[73] Assignee: GCA Corporation, Bedford, Mass.

[22] Filed: Mar. 7, 1975

[21] Appl. No.: 556,207

[52] U.S. Cl. .................................. 198/19; 34/92; 198/219
[51] Int. Cl.[2] .......................................... B23Q 17/18
[58] Field of Search .................... 198/19, 218, 219; 34/92

[56] References Cited
UNITED STATES PATENTS

| | | | |
|---|---|---|---|
| 2,642,179 | 6/1953 | Cross | 198/218 |
| 2,771,173 | 11/1956 | Sharpe | 198/218 X |
| 2,899,043 | 8/1959 | Young | 198/219 |
| 2,916,276 | 12/1959 | Cone et al. | 198/218 X |
| 3,192,645 | 7/1965 | Oetjen et al. | 198/19 X |
| 3,234,661 | 2/1966 | Nerge | 34/92 X |
| 3,355,008 | 11/1967 | Milazzo | 198/219 |
| 3,469,327 | 9/1969 | Janovtchik et al. | 34/92 |
| 3,471,134 | 10/1969 | Cone | 198/219 X |
| 3,473,643 | 10/1969 | Janiske | 198/19 |
| 3,717,119 | 2/1973 | Boys et al. | 198/19 X |

Primary Examiner—Evon C. Blunk
Assistant Examiner—Richard K. Thomson
Attorney, Agent, or Firm—Kenway & Jenney

[57] ABSTRACT

Equipment for processing workpieces on a continuous basis under vacuum transfers workpieces from a feed compartment to an evacuated processing compartment, and removes processed workpieces to a discharge compartment, with a single reciprocating carriage and with lifters that selectively raise workpieces from the carriage and deposit them again. The carriage passes between the processing compartment and the terminal compartments through vacuum valves.

9 Claims, 9 Drawing Figures

ARTICLE DELIVERY AND TRANSPORT APPARATUS FOR EVACUATED PROCESSING EQUIPMENT

BACKGROUND OF THE INVENTION

This invention provides vacuum processing equipment in which workpieces are fed into, through, and out of an evacuated processing chamber on a continuous basis. More generally, the invention relates to equipment for transferring articles into, through, and from a vacuum chamber or other compartment having a selected atmosphere. The equipment allows the processing chamber to remain continuously under the selected vacuum or other atmosphere, while articles are conveyed into and out of it.

Prior evacuated processing equipment has the problem of maintaining the processing chamber under vacuum while feeding fresh workpieces into it and removing the processed ones. One solution is to operate on a batch basis, but this requires that the machine be shut down, with loss of vacuum and with possible contamination of the processing chamber, to load in a new batch of pieces and to remove the batch of processed pieces. Also, these machines have an excessive volume, for storing the batches of workpieces, which must be evacuated after each load/unload interruption. Other prior vacuum processing equipment uses a continuous conveyer within the processing chamber and separate feed and discharge conveyers. The transfer of workpieces between the conveyers requires careful synchronization, otherwise workpieces do not transfer properly. This malfunction generally requires that the machine be shut down, with the loss of vacuum. The prior art has also used a single rotary conveyer operating within a vacuum chamber and which loads and unloads workpieces through an air lock. The circular construction and rotary operation of this machine, however, have been found to be disadvantageous.

Accordingly, it is an object of this invention to provide equipment for the continuous processing of workpieces under a selected atmosphere during the feed and the discharge of workpieces.

Another object is to provide equipment of the above character which avoids multiple-conveyor synchronizing problems attendant with the prior art.

A further object of the invention is to provide equipment of the above character and which has a single drive mechanism for moving workpieces between stations in both the processing and the terminal chambers.

It is also an object to provide equipment of the foregoing character that has a relatively small processing chamber volume that has to be maintained under the selected atmosphere.

Other objects of the invention will in part be obvious and will in part appear hereinafter.

The invention is described herein with particular reference to a vacuum system, but features of the invention apply equally to other equipment wherein articles are processed under a selected non-environmental atmosphere.

SUMMARY OF THE INVENTION

Vacuum equipment according to the invention has a single conveyer carriage that reciprocates between aligned terminal and processing stations. Separate vacuum-tight compartments house the processing stations and house each terminal station, and a vacuum valve is interposed between the processing compartment and each terminal compartment.

There typically are two terminal compartments, one at each end of the processing compartment. One houses a feed station from which fresh articles are delivered to the processing stations and the other houses a discharge station to which processed articles are delivered for removal from the equipment. When the vacuum valves are closed, an operator can open the terminal compartments to load in new workpieces and to remove processed workpieces, without disturbing the vacuum condition in the processing compartment. The vacuum system pumps down the terminal compartments after they are closed, after which the vacuum valves open to enable transport of parts between the compartments.

The single conveyer carriage is contained within the processing compartment when the vacuum valves are closed, but upon reciprocation extends into each terminal compartment, through open vacuum valves, for the transfer of pieces relative thereto. At each station, i.e. at each processing station, and at the feed and the discharge stations, a lift mechanism selectively removes workpieces from the conveyer carriage and alternatively returns them, to provide selected conveyance. For example, the lift mechanism raises workpieces off the carriage during each reverse reciprocation and returns the workpieces to the carriage during forward movement. This operation provides an incremental advance of workpieces from the feed station to and through successive processing stations, and finally to the discharge station.

The invention thus provides a unique arrangement of in-line stations, separate terminal compartments that form locks between the selected non-environmental atmosphere and the environment, compartment-separating vacuum valves, a single reciprocating carriage, and a list mechanism for selectively loading and unloading articles from the carriage at each station.

With this arrangement, the processing chamber is continuously under the selected vacuum atmosphere and hence can process workpieces on a continuous basis. The in-line arrangement of the various stations facilitates efficient, flexible and low cost construction and operation, and the processing compartment can be constructed with minimal volume commensurate with the required processing apparatus. The single conveyance carriage services all the stations, and coupled with the lift mechanism can provide incremental movement of articles between stations in either direction.

The invention accordingly comprises the features of construction, combinations of elements and arrangement of parts exemplified in the constructions hereinafter set forth, and the scope of the invention is indicated in the claims.

BRIEF DESCRIPTION OF THE DRAWINGS

For a fuller understanding of the nature and objects of the invention, reference should be had to the following detailed description taken in connection with the accompanying drawings, in which.

DESCRIPTION OF ILLUSTRATED EMBODIMENT

Figure 1:
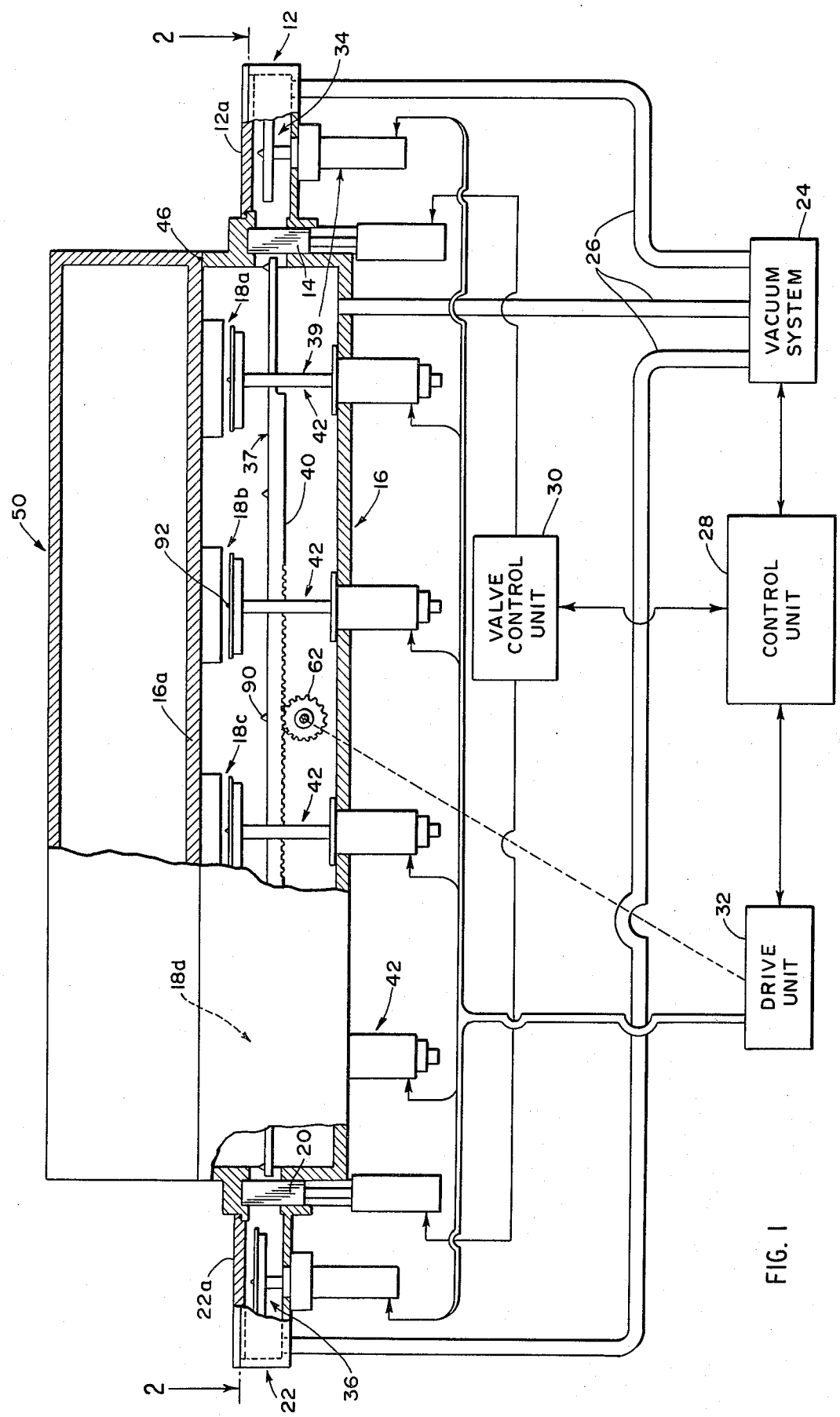
FIG. 1 shows evacuated processing equipment embodying the invention, partly broken away in elevation and partly in schematic block form.

FIG. 1 shows a vacuum processing system useful, for example, for the sputter deposition of materials in the manufacture of semiconductors. The system accepts workpieces, e.g. semiconductor substrates on a tray, at a feed compartment 12. A conveyer mechanism transfers the parts through a vacuum valve 14 to a processing compartment 16 where four processing stations 18a, 18b, 18c and 18d successively subject the workpieces to the desired processing, e.g. sputter deposition of material, etching and the like. The processed workpieces are transferred from the processing compartment through a second vacuum valve 20 to a discharge compartment 22, from which an operator removes them. The workpieces are introduced to the feed compartment 12 by opening the top cover 12a thereof and similarly are removed from the discharge chamber 22 through an openable top cover 22a. Each terminal compartment 12, 14 together with the vacuum valve 14, 20 associated with it thus serves as an air-to-vacuum lock for the introduction and removal of articles relative to the processing chamber 16 without disturbing the vacuum condition and hence the processing therein.

A vacuum system 24 is connected by separate vacuum pipes 26 to each compartment 12, 16 and 22. The vacuum system includes conventional high vacuum pumping equipment for individually pumping each chamber to a selected vacuum and maintaining at that condition. A control unit 28 operates the vacuum system 24 for this operation, and to vent the vacuum in the feed compartment and in the discharge compartment prior to their being opened. The control unit also operates a valve control unit 30 to open and to close the vacuum valves 14, 20; annd ensures that the valves are closed prior to the venting of the terminal compartments 12 and 22.

The control unit 28 in addition controls the operation of a drive unit 32 which operates the elements of a workpiece transport system. The transport system advances workpieces successively from a feed station 34 within the compartment 12 through the processing stations 18 and to a discharge station 36 in the compartment 22. With further reference to FIG. 1 together with FIGS. 2 and 3, the transport system provides this operation with a carriage 37 that can be driven in either direction between the aligned stations 18, 34, and 36; and with a lift mechanism 39 that selectively allows the workpieces to move with the carriage or holds them stationary relative to the carriage, typically by removing them from the carriage. The illustrated carriage is constructed with two interconnected carrier bars 38 and 40 that support trays of workpieces. The carrier bars are mounted for longitudinal sliding movement, driven by a rack-and-pinion mechanism, within the processing compartment and to extend into either terminal compartment. The illustrated lift mechanism has a separate lifter 42 at each station. Each lifter can assume either of two vertical positions, as FIGS. 3 and 4 show with solid and with dashed lines.

The reciprocating movement of the carrier bars can move workpieces back and forth along a path which traverses the aligned stations 34, 18a, 18b, 18c, 18d and 36 in succession. The lifters selectively remove workpieces from the carrier bars and return them to provide the desired advance of the workpieces through the system. In one mode of operation, the lifters 42, shown raised in FIG. 1, are raised to remove the workpieces from the carrier bars during reverse movement, i.e. movement to the right in FIGS. 1, 2 and 3. The lifters return the parts to the carrier bars during forward movement of the carriage. This mode of operation incrementally adavances the workpieces from one station to the next in a forward, i.e. right to left, direction. However, the transport system formed by the carriage and the lift mechanism is flexible, in that workpieces can be moved backwards and forwards selectively between the several stations, for example to repeat processing operations where this is desired. Alternatively, workpieces can be fed in at either or both ends of the processing compartment through the air-to-vacuum locks formed by the terminal compartments 12 and 22, processed within the compartment 16 and then discharged at whichever end is desired.

Figure 2:
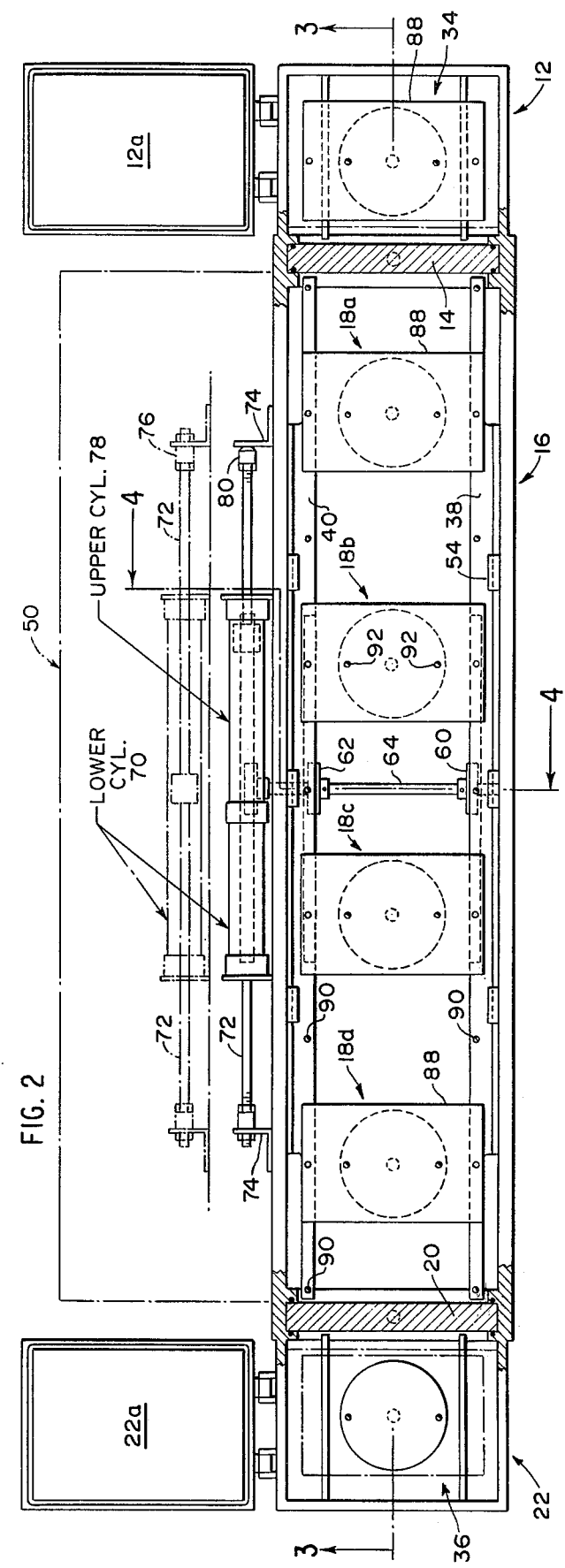
FIG. 2 is a top plan view of evacuated processing equipment of FIG. 1 as seen along line 2—2 thereof.
Figure 3:
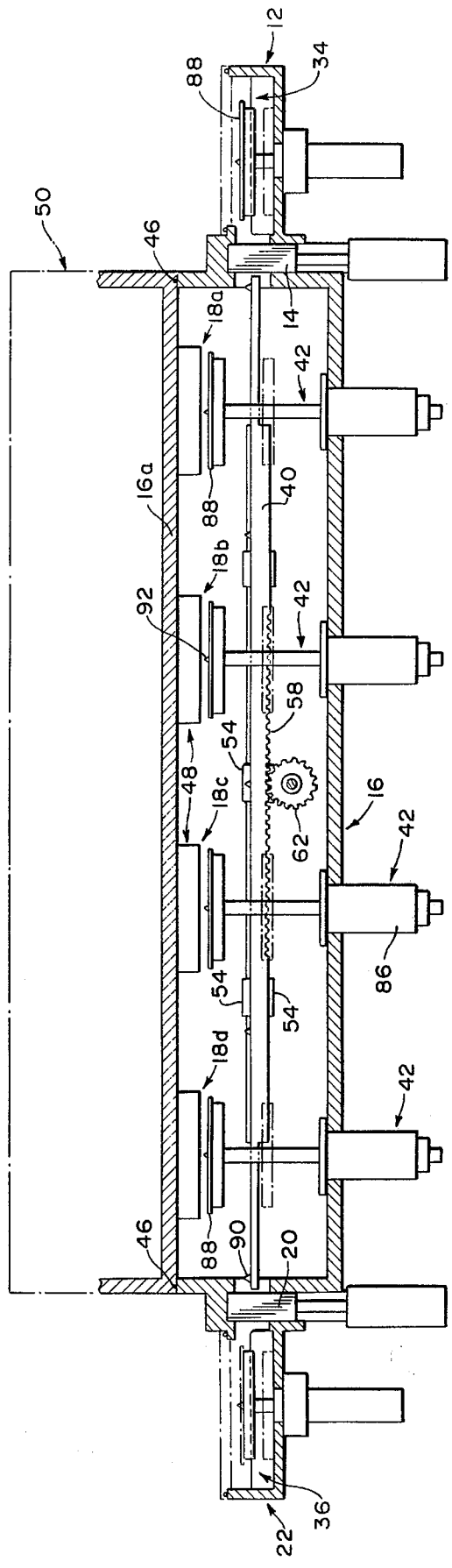
FIG. 3 is a side elevation cross-sectional view taken along line 3—3 of FIG. 2.
Figure 4:
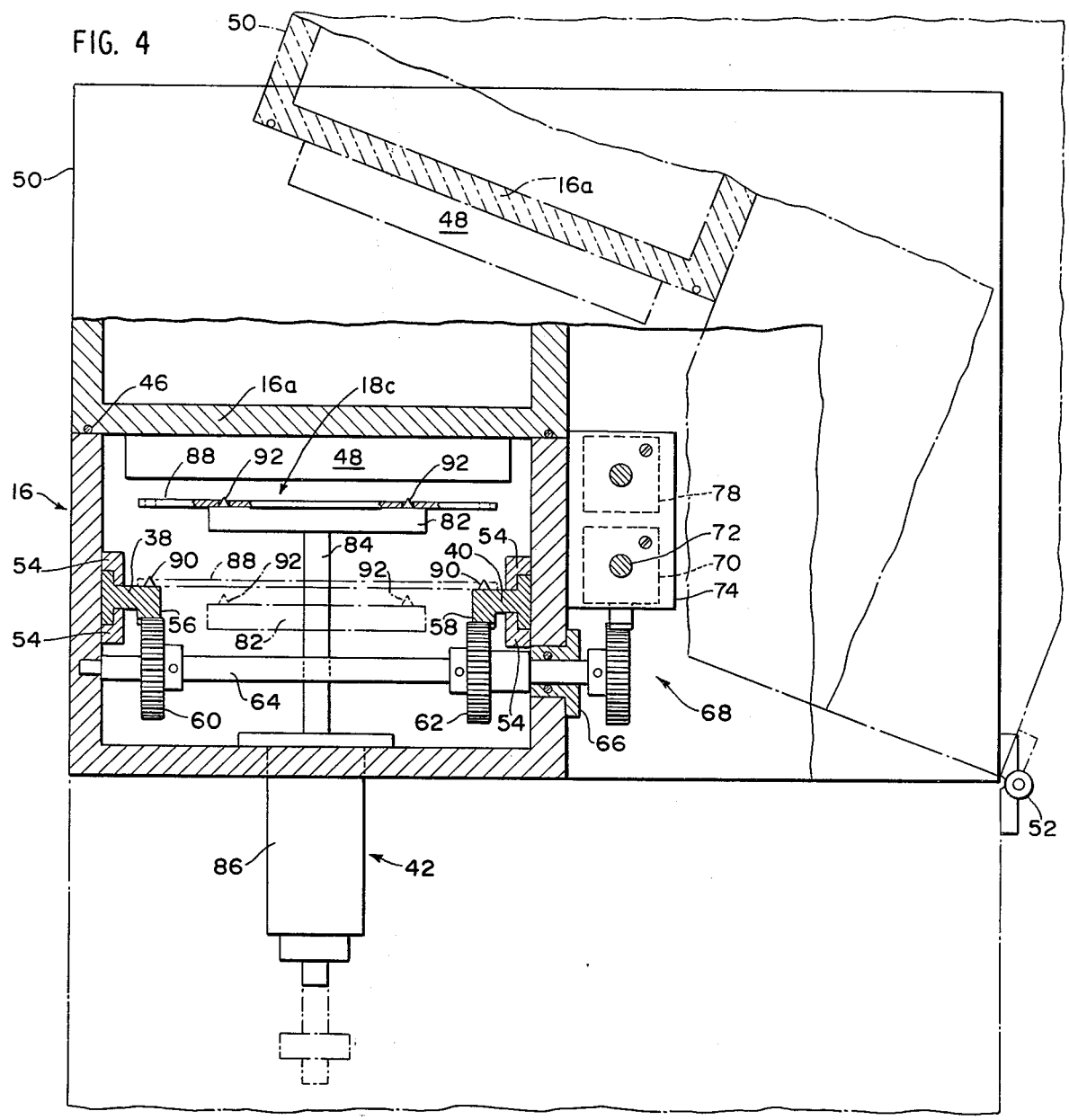
FIG. 4 is a transverse cross-sectional view taken along line 4—4 of FIG. 2.

With further reference to FIGS. 2, 3 and 4, the processing compartment 16 of the illustrated machine is a pressure-tight enclosure of structural metal. The compartment top plate 16a can be opened, as shown in FIG. 4, to provide access to the interior, and an O-ring gasket 46 seals it to the compartment sidewalls when closed. The top plate 16a mounts processing equipment 48 within the compartment and, in addition, forms a bottom wall of an enclosure 50 which houses further apparatus pertinent to the processing to be performed within the compartment 16. The processing equipment 48 and the processing apparatus within the housing 50 are selected and constructed according to conventional skill and practices and are not described further. As FIG. 4 details, the top plate 16a opens by way of a hinge 52 affixed to the housing enclosure 50. The construction lifts all of the processing apparatus out of the way above the top plate 16a for free access to the interior of the processing compartment.

The carrier bars 38 and 40 of the carriage 37 are mounted within the processing compartment 16 adjacent the sidewalls for sliding reciprocating movement along the length of the compartment. In the illustrated construction, slidebearing brackets 54 affixed to the compartment mount the bars by engagement with a rail integrally extending along each carrier bar. The rack-and-pinion drive mechanism for the carriage includes racks 56, 58 affixed to the bars 38, 40 respectively and pinions 60, 62 respectively operatively engaged therewith. The pinions 60, 62 are keyed to a common shaft 64 that is journal mounted in the compartment extending transverse to the length thereof and passes within a pressure seal 66 through the compartment back wall to a further rack-and-pinion mechanism 68. The pinion of this mechanism is keyed to the outer end of the shaft 64 and the rack thereof is carried on and driven by a fluid, i.e. pneumatic or hydraulic, cylinder 70.

Figure 5:
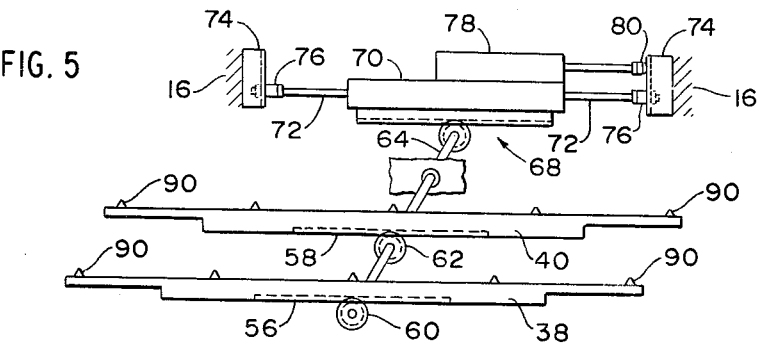
FIG. 5 is a perspective fragmentary view of the transport mechanism of the equipment of FIGS. 1 and 2.

The drive cylinder 70 is fitted with double-ended piston rods 72, 72; FIGS. 2, 4 and 5. These rods are affixed at their ends distal to the cylinder to the walls of the processing compartment 16 by brackets 74, 74. The application of pressure to the drive cylinder 70 moves it forward, i.e. to the left in FIG. 2, or backward, i.e. to the right, depending on which end of the cylinder is being pressured. The rack and pinion 68 converts the cylinder movement to rotation of the shaft 64, with the result that the carrier bars 38 and 40 move in the same direction as the cylinder 70. A shoulder 76 threaded on each rod 72 provides an adjustable limit on the travel of the cylinder 70. With this construction, backward movement of the cylinder, against the shoulder 76 on the right, slides the carrier bars 38 and 40 a sufficient distance into the feed chamber 12 to transport workpieces from the feed station 34 therein to the processing station. Similarly, forward movement of the cylinder 70 against the left shoulder drives the carrier bars 38 and 40 into the discharge compartment 22 for transferring workpieces to the station therein from the processing chamber.

As FIGS. 2, 4 and 5 also show, the drive cylinder 70 carries a single-ended fluid control cylinder 78 which operates iin the following manner to center the carrier bars 38 and 40, i.e. to locate the carriage 37 entirely within the processing chamber 16 as shown in FIGS. 1, 2 and 3 so that the vacuum valves 14 and 20 can close. The single piston rod of the cylinder 78 carries a stop 80 at its remote end. When the piston rod of the cylinder 78 is fully extended, the stop 80 abuts the bracket 74 when the cylinder 70 is in its mid-position. The abutment of the stop 80 against the bracket 74, with the control cylinder 78 under pressure, prevents the drive cylinder 70 from further reverse or rightward movement, due to the greater force of the single-ended cylinder over that of the double-ended cylinder. Hence, activating the single-ended control cylinder 78 prevents the double-ended drive cylinder 70 from moving further to the right than the mid-position.

Of course, when the single-ended cylinder 78 is not energized, the piston rod thereof retracts and allows the doubleended cylinder 70 to travel fully between the two shoulders 76, 76.

FIGS. 3 and 4 show that each illustrated lifter 42 has a platform 82 for carrying workpieces or a tray 88 thereof, and a post 84 that supports the platform. A solenoid actuator 86 supportingly carries the post for raising and alternately lowering it and the platform 82. The lifter is mounted within the chamber to position the post and the platform between the carrier bars 38 and 40 and centered at a station. To minimize the volume of the processing compartment, the solenoid housings extend outside the compartment 16 through pressure-tight passages. The solenoid of the lifter 42 places the platform 82 in either a raised, extended position as shown with solid lines in FIG. 4 or a lowered, retracted position as shown with dashed lines. In the raised position, the top of the platform is above the carrier bars 38 and 40, whereas in the retracted position it is below the carrier bars. Hence, in the raised position, the lifter platform lifts a workpiece-carrying tray 88 upward off the carrier bars so that it does not move with them. In the retracted position of the lifter, however, the tray again rests on the carrier bars for movement with them. As FIGS. 4 and 5 illustrate, the carrier bars 38 and 40 and the lifter platforms 82 have centering pins 90 and 92, respectively, for matingly engaging holes in the tray 88. This ensures that the tray is in a selected positon relative to the lifters and the carrier bars, whichever element is supporting the tray, and that the tray moves without slippage relative to the carrier bars.

Figure 6A:
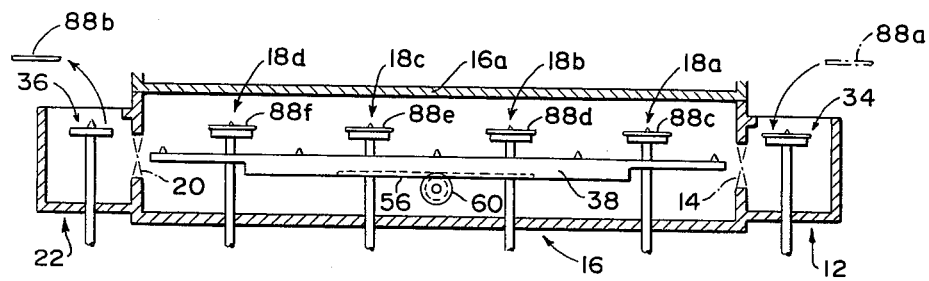
FIGS. 6A, 6B, 6C and 6D are simplified illustrations of the equipment of FIGS. 1 and 2 at succesive operational stages thereof in accordance with the invention.

With reference again to FIG. 1, the control unit 28 and the associated control elements 24, 30 and 32 can be contructed according to techniques conventional to those skilled in the art for controlling the overall workpiece-transporting system of th machine with a hard-wired sequencing network of stepping switches and relays or with electronic circuits, even including a programmed computer. Whatever construction is selected, the equipment can, by way of example, provide the following operating sequence illustrated in FIG. 6. FIG. 6A shows the system in the condition for loading and unloading the terminal stations 34 and 36. The carrier bars 38, 40 are centered to be fully within the processing compartment 16, the lifters 42 are in the raised position, the vacuum valves 14 and 20 are both closed, and the vacuum system 24 (FIG. 1) vents the terminal compartments 12 and 22 to the ambient pressure. The load compartment 12 and the discharge compartment 22 can be opened, as indicated in FIG. 6A, for introducing a new tray 88$a$ of workpieces to the system and for removing a tray 88$b$ of fully processed workpieces at the other end. Within the processing station 16 are trays of workpieces 88$c$, 88$d$, 88$e$ and 88$f$ at the stations 18$a$, 18$b$, 18$c$ and 18$d$ respectively.

From the foregoing load/unload condition of the system 10, the system 10, the system proceeds to advance the article at the load and at each processing station. The compartment covers 12$a$ and 22$a$ are closed, sealing the interior of these compartments from the environment. The vacuum system 24 then evacuates the compartments 12 and 22 to the same condition of vacuum as it is maintaining in the processing compartment 16. With the three compartments at the same desired vacuum condition, the control unit 28 operates the valve control unit 30 of FIG. 1 to open the vacuum valves 14 and 20.

The control unit 28 next operates the drive unit 32 to retract the piston rod of the control cylinder 78 and to move the drive cylinder 70 fully to the right. This movement shifts the carrier bars a half step in the backward direction, i.e. from the centered position of FIG. 6A to the extreme right position shown in FIG. 6B, where the carrier bars extend into the load compartment 12. As FIG. 6A shows, in the former position the carriage centering pins 90 are mid-way between stations, whereas in the latter position of FIG. 6B the carriage pins are aligned at stations.

Figure 6B:
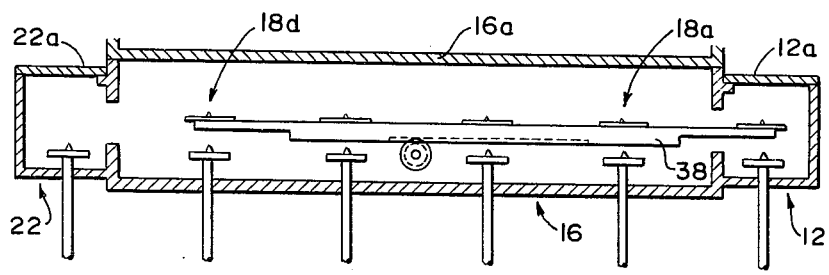

At this juncture, the control unit 28 operates the drive unit 32 to retract the lifters 42. This transfers the trays 88$a$, 88$c$, 88$d$, 88$e$ and 88$f$ from the lifters 42 to the carrier bars 38, 40. FIG. 6B shows the system upon completion of this sequence of operations.

Figure 6C:
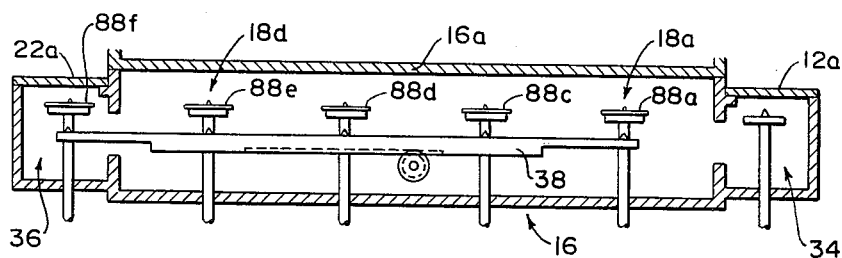
Figure 6D:
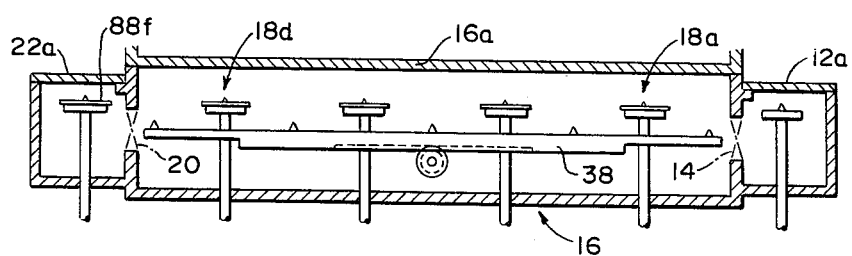

With the workpiece trays now on the carrier bars, the carriage 37 is advanced a full step by actuating the drive cylinder 70 to move fully to the left. This moves the carrier bars in the forward, leftward direction by the uniform distance which separates the successive stages within the system. Accordingly, the newly-loaded tray 88$a$ of fresh workpieces is now in the processing station 18$a$, and the tray 88$f$ that previously was in the final processing stage 18$d$ is now in the discharge station 36. Next, the lifters 42 are actuated to raise the platforms; this lifts the workpiece trays from the carrier bars. FIG. 6C shows the condition of the system at this juncture.

The next step in the illustrated operating sequence is for the control unit 28 to actuate the drive unit 32 to extend the control cylinder 78 and to then shift the drive cylinder 70 a full increment to the right. This combination of operations moves the drive cylinder 70 rearward from the extreme left, forward position to the middle position. The extended control cylinder 78 prevents the drive cylinder from further rightward movement, as FIG. 5 show. Consequently, the carrier bars are in the central position shown in FIG. 6D. The control unit 28 then operates the valve control unit 30 to close the vacuum valves 14 and 16. At this time, the processing of workpieces within the chamber 16 generally is performed. At the same time, the vacuum system 24 can vent the vacuum condition in the terminal stations to return them to ambient pressure. This readies the system for the next step, which is a repeat of the steps described above with reference to FIG. 6A.

As indicated above, alternative operating sequences can be employed with the transport apparatus of the invention. The sequence used operate with only a single terminal compartment, instead of two, it can use both terminal compartments as shown but for both loading and unloading, and it can employ both forward and backward incrementing of articles.

With whatever sequence is used, the processing compartment of equipment embodying the invention can have a small, easily evacuated and controlled volume, and the processing stations can continually be under the selected vacuum or other selected atmosphere condition. The fee, processing and unload stations of the equipment are uniformly spaced and aligned along a path that the reciprocating carriage traverses. This carriage for the transport of workpieces has a single structural assembly that moves laterally and has minimal need for being synchronized with other mechanisms for the conveyance of workpieces. The arrangement of the singly-driven carrier bars, two-position lifters, and aligned stations thus provides multiple benefits and advantages in terms of ease of control, flexibility of operations, simplicity of construction, and overall economy of construction and of operation.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawings, shall be interpreted as illustrative and not interpreted in a limiting sense. It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In apparatus for processing workpieces in a selected vacuum atmosphere, the improvement comprising
   A. first means forming an aligned arrangement of a set of at least two stations for said processing of workpieces and at least two terminal stations for the transferral of workpieces to and/or from said set of processing stations, said processing stations being located between and aligned with said terminal stations,
   B. second means for providing said selected atmosphere at said set of processing stations,
   C. third means for providing, and alternatively for terminating, said selected atmosphere at each said terminal station,
   D. workpiece transporting means including a carriage member normally disposed within said set of processing stations to be outside of said terminal station and selectively movable back and forth between either terminal station and said set of processing stations for transferring workpieces therebetween, and a further member selectively operable for holding workpieces stationary relative to said back-and-forth movement of said carriage member and alternatively for allowing workpieces to move with such movement of said carriage member, and
   E. sequence control means connected with said transport means and with said third means, said control means operating said third means to provide said selected atmosphere at each terminal station during the disposition of said carriage transport member thereat, and operating said third means to terminate said selected atmosphere at each terminal station at selected times during the disposition of said carriage member outside that terminal station.

2. In apparatus processing workpieces in a selected vacuum atmosphere, the improvement comprising
   A. a processing enclosure for supporting said vacuum atmosphere therein and for housing therein a set of at least two stations for said processing of workpieces,
   B. a terminal enclosure selectively closable from the environment and, independently, from said processing enclosure for supporting said vacuum atmosphere therein and for housing at least one terminal station for the transferral of workpieces to and/or from said set of processing stations, said terminal and processing enclosures being in a side-to-side disposition in which said stations are arrayed along a path,
   C. atmosphere-blocking valve means communicating between said processing and terminal enclosures along said path, said valve means having an atmosphere-passing open condition for the passage of workpieces herethrough between said enclosures and having an atmosphere-blocking closed position for closing said terminal enclosure from said processing enclosure,
   D. workpiece-transporting means including carriage means normally disposed within said processing enclosure to be outside of said terminal enclosure and selectively movable in incremental steps back and forth along said path through said open valve means between said terminal station and said set of processing stations for transferring workpieces therebetween, and lift means selectively engageable with workpieces on said carriage means for holding workpieces stationary relative to said back-and-forth movement of said carriage means and alternatively for allowing workpieces to move with said movement of said carriage means.

3. In apparatus as defined in claim 2, the improvement further comprising sequence control means connected with said valve means and with said transport means for sequentially disposing said carriage means in one said enclosure free of interference with said valve means and closing said valve means, and alternatively for sequentially opening said valve means and moving said carriage means between said enclosures.

4. In apparatus as defined in claim 2, the further improvement in which

A. said carriage means includes a pair of carrier members horizontally disposoed and spaced apart in the direction transverse to said path, and B. said lift means includes a workpiece lifter vertically movable between a raised position in which it passes between said spaced-apart carrier members to lift workpieces from said carriage means and a lower position in which it is disposed below said carrier members.

5. In apparatus as defined in claim 2, the improvement further comprising rack-and-pinion transport drive means including a first rack member movable back and forth longitudinal to said path, a further rack member coupled for movement with said carriage means, and interconnected pinion members operatively coupled to both said rack members.

6. Apparatus for processing workpieces in a selected non-environmental atmosphere comprising in combination A. selectively openable and closable atmosphereisolating valve means, B. an openable and reclosable processing compartment for housing a set of at least two stations for said processing of workpieces and for supporting said non-environmental atmosphere therein when closed, C. an openable and reclosable terminal compartment for housing a terminal station for workpieces and for supporting said atmosphere therein when closed, said terminal compartment being aligned with said processing compartment with said valve means therebetween for the transfer of workpieces between said compartments by way of said valve means when open, and D. a workpiece-transferring transport member disposed within said processing compartment and arranged for reciprocating movement through said open valve means into and out of said terminal compartment for the transfer of workpieces between said compartments, said transport member being arranged for undergoing said reciprocating movement in incremental steps between plural positions including a first position where said transport member is entirely within said processing compartment and out of alignment with stations, and a second position where said transport member is within both compartments and aligned with stations.

7. Apparatus as defined in claim 6

A. further comprising a second openable and reclosable terminal compartment for housing a second terminal station for workpieces and for supporting said atmosphere therein when closed, said second terminal compartment being aligned along a lineal path with said processing compartment and said first-mentioned terminal compartment, B. further comprising selectively openable and closable atmosphere-isolating second valve means disposed between said second terminal station and said processing compartment for the transfer therethrough, when open, of workpieces between said second terminal and processing compartments, and C. in which said transport member is further arranged for undergoing said reciproocal movement with a third position where said transport member is aligned with stations in both said processing compartment and said second terminal compartment and is entirely outside said first-mentioned terminal compartment.

8. Apparatus for transporting articles into and out of a selected non-environmental atmosphere, said apparatus comprising in combination A. selectively openable and closable valve means providing a gate for the passage of articles therethrough and, alternatively, for isolating atmospheres thereacross, B. a first enclosure for supporting said selected atmosphere therein, C. an openable and reclosable terminal enclosure for supporting said atmosphere therein when closed, said terminal enclosure being aligned with said processing enclosure along an article-transporting path with said valve means therebetween for the transfer of articles between said enclosures by way of said valve means when open, D. carriage means mounted within one said enclosure and arranged for back-and-forth movement longitudinal to said path through said open valve means into and out of the other enclosure for the carriage thereon of articles between said enclosures, said carriage means being movable between plural positions including at least a first position where it is within said one enclosure and free of the other enclosure and a second position where it extends from said one enclosure into said other enclosure, E. at least first and second article-lifting members, each arranged for selectively moving articles from said carriage means and alternatively returning articles to said carriage means for carriage thereon, one said lifting member being disposed within said first enclosure and the other being disposed within said terminal enclosure, and F. sequence control means for sequentially positioning said carriage means in said one enclosure out of interference with said valve means and closing said valve means, and alternatively sequentially opening said valve means and moving said carriage means therethrough between said enclosures.

9. Apparatus according to claim 8

A. further comprising means for providing said selected atmosphere continually within said first enclosure, B. further comprising means for providing said selected atmosphere in said second enclosure and alternatively for venting the atmosphere therein to the environment, and C. in which said sequence control means actuates said means for providing said atmosphere in said second enclosure to provide said atmosphere when said valve is closed and to vent said atmosphere intermediate the opening and the closing of said valve means.

* * * * *